United States Patent Office 3,564,841
Patented Feb. 23, 1971

3,564,841
MANUAL AND AUTOMATIC SPEED CONTROL SYSTEMS FOR GAS TURBINES
Malcolm John McArthur, Whetstone, England, assignor to The English Electric Company Limited, London, England, a British company
Filed July 24, 1969, Ser. No. 844,253
Claims priority, application Great Britain, Aug. 2, 1968, 36,946/68
Int. Cl. F02c 9/02; F02d 39/00
U.S. Cl. 60—6                                8 Claims

ABSTRACT OF THE DISCLOSURE

A control system by which the speed of a gas turbine can be controlled either automatically or manually, with a smooth change-over from one to the other. The system includes a pivoted lever 2 which controls the turbine throttle 12 under the action of an hydraulic servo-device 14 controlled by a governor 20 during automatic operation. The lever pivot is a shaft 4 connected to a manually controlled motor 6 via a reduction gear 10 and a clutch 8 which is engaged when a throw-over switch 32 is operated to neutralise the servo-device 14.

---

This invention is concerned with control systems, and especially gas turbine speed control systems, which are required usually to operate automatically under the control, for example, of a governor, but for which there may sometimes be a need for manual control. Manual control may, for example, be needed occasionally for a gas turbine for test running or for emergency use in the event of the automatic control system failing. For example, a gas turbine driving a generator for use as an emergency or peak-lopping set in a power station should be capable of immediate manual control to maintain it running if the automatic control system fails.

According to the invention, a control system includes; a shaft mounted to rotate about its longitudinal axis; a lever secured to the shaft and extending substantially radially therefrom; a manually controlled reversible motor for rotating the shaft; clutch means whereby the motor may be disconnected from the shaft; an hydraulic servo-device connected to the lever; a governor for controlling the servo-device; and a throw-over switch which in one position allows the position of the lever and thus an associated output member to be controlled automatically by the servo-device with the clutch means disengaged, and in another position causes the clutch to engage and at the same time neutralises the servo-device whereby to enable the position of the lever to be manually controlled by the motor.

Preferably the motor is arranged to drive the shaft via a reduction gear which may include a worm and worm-wheel, the effective pitch of the worm being such that a torque applied to said shaft may not cause rotation of the motor.

Conveniently said clutch means comprises an electro-magnetic clutch and said motor is an electric motor.

Preferably also, an hydraulic damper is provided for limiting the rate of change of the system output during automatic control of the lever position.

The invention makes possible the use of proprietary components which are relatively inexpensive, so that the whole automatic/manual control system can be made relatively inexpensively. Moreover the system is one which enables the switch-over from automatic control to manual control to be achieved simply and smoothly.

Figure 1:
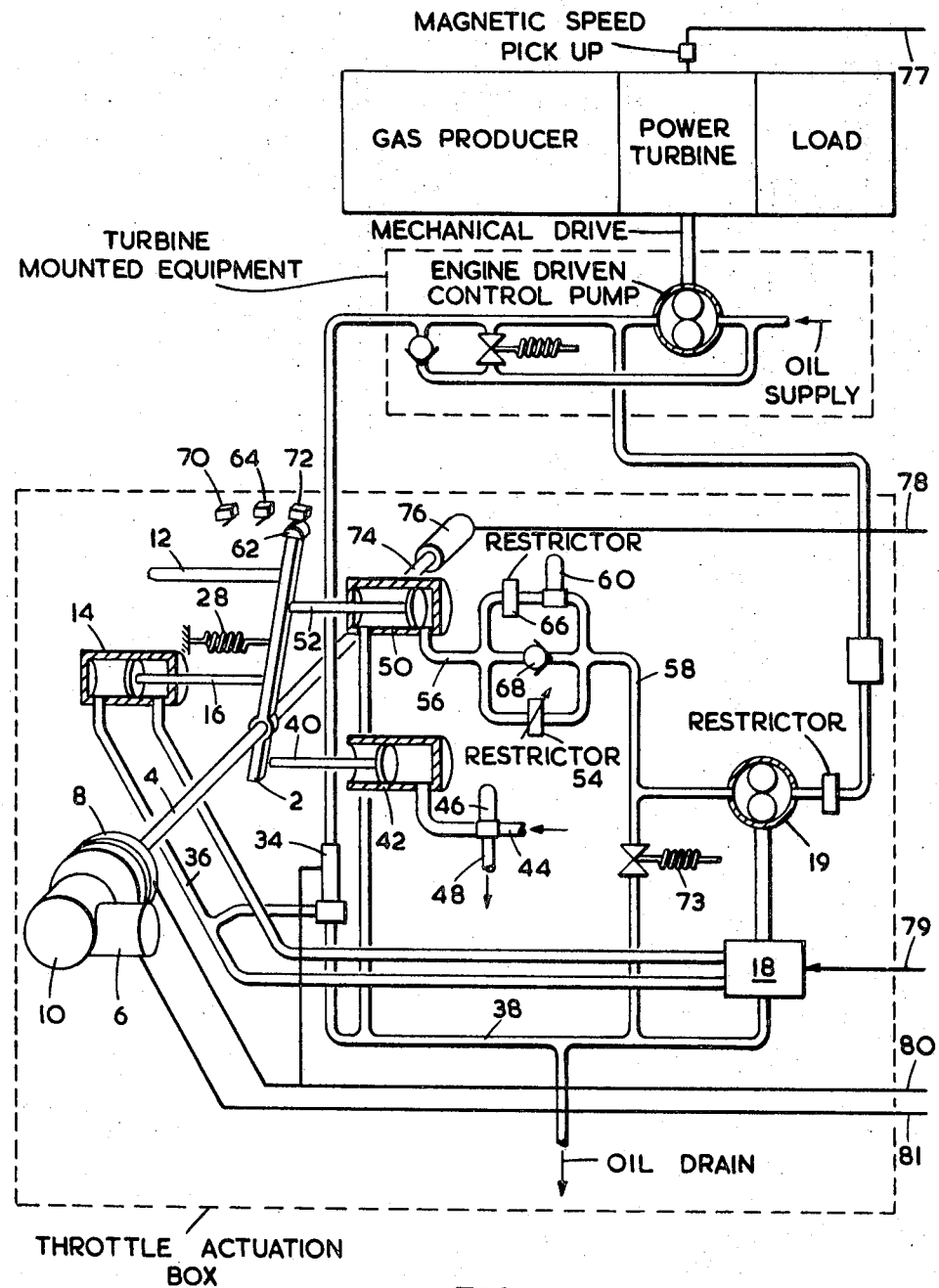
Figure 2:
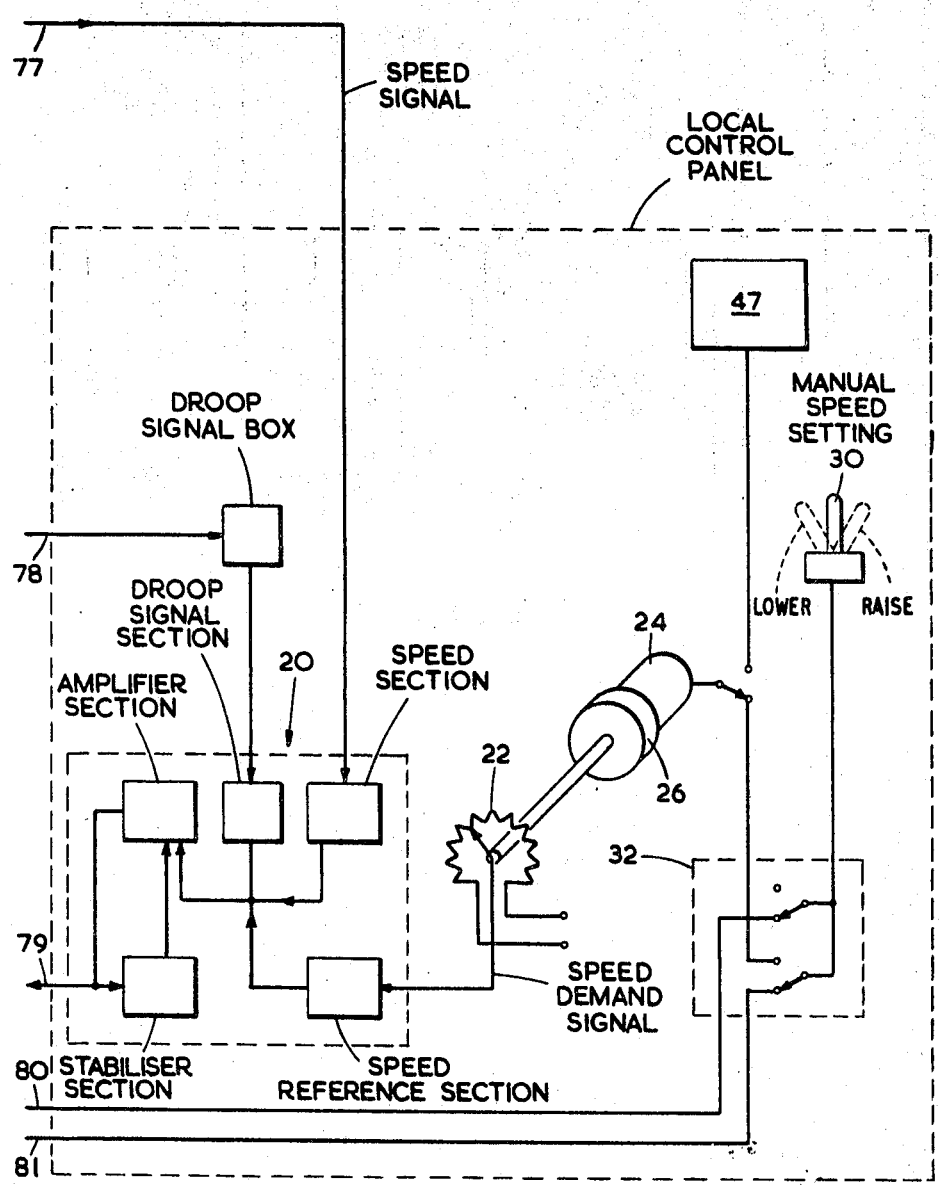

An example of a gas turbine speed control system is shown diagrammatically in the accompanying drawing which is divided into FIGS. 1 and 2, signal line connections 77, 78, 79, 80 and 81 being provided therebetween.

The system shown is designed to control a turbo jet engine used as a gas producer to power a separate turbine. This assembly may, for example, be used to drive a generator.

The system comprises basically a lever 2 mounted on a shaft 4 which is connected to a reversible D.C. motor 6 via an electro-magnetic clutch 8 and a worm reduction gear box 10. A cable 12 connected to the upper end of the lever extends to the gas producer throttle to control the fuel supply to the gas producer. Movement of the cable to the right increases the fuel supply, and vice versa.

Automatic control of the lever is achieved by means of an hydraulic servo-device 14 including a rod 16 which is pivotally connected to the lever. This servo-device is controlled by means of an electrically-controlled device 18 driven by an oil-powered motor 19 which derives its electrical control signal from a governor 20. The control speed set by the governor is determined by a potentiometer 22 driven by a reversible D.C. motor 24 via a worm reduction gear box 26.

Movement of the lever 2 in a clockwise direction (to increase the fuel supply to the gas producer) is resisted by a return spring 28.

During automatic control operation, the electro-magnetic clutch 8 is disengaged, and the controlled speed set by the governor can be raised or lowered by a lever 30 on a control panel. Movement of the lever to the right causes the motor 24 to rotate in a direction such as to increase the control speed, and movement to the left achieves the opposite effect. The system includes various indicators, such as a generator frequency indicator and a turbine speed indicator, and also an electrical meter indicating whether the governor 20 is demanding an increased turbine speed, a decreased speed, or no speed change at all.

When manual control is required, for example in the event of the automatic control failing, a throw-over switch 32 is closed which energizes the electro-magnetic clutch 8 and also a solenoid valve 34. This valve neutralises the servo-device by connecting a high pressure oil pipe 36 to a return pipe 38. Throttle control is then still achieved by means of the lever 30 which, by virtue of a change-over switch (not shown) operated by the switch 32 now controls the supply of current in one direction or the other to the motor 6. As before, movement of the lever 30 to the right rotates the motor in the direction needed to increase the fuel supply to the gas producer, that is to say by rotating the lever in a clockwise direction, and movement of the lever 30 to the left conversely reduces the fuel supply.

It will be noted that no sudden change in the fuel supply to the gas producer will occur when the system is switched over from automatic control to manual control. If the facility is needed of changing at any time smoothly from manual control to automatic control, this may be achieved by allowing the potentiometer 22 to be rotated manually by the operator by means of an easily accessible knob until the appropriate meter is showing that the turbine speed is matched by the governor setting, after which the throw-over switch 32 may be opened and the system can then proceed under automatic control.

The procedure when starting up is as follows. The gas producer is started and speeds up to an idling speed determined by a piston rod 40 which projects out of a cylinder 42 to the full extent of its travel and displaces the lever 2, against the action of the spring 28, to an idling position. The piston in the cylinder 42 is powered by nitrogen supplied through a pipe 44 via a solenoid valve 46. When the gas producer achieves idling speed, the supply of fuel to the gas producer is increased by an automatic sequence control signal which energizes the clutch 8 and energizes the motor 6 in the raise direction until an intermediate limit switch (not shown) is operated by the lever 2 in a position such as to allow sufficient fuel flow for the power turbine to attain at least synchronous speed. At a predetermined point in the power turbine acceleration the clutch 8 is de-energized and the solenoid valve 34 de-energized to put the system under automatic control before the desired governed speed is attained under control of an automatic synchroniser 47. Alternatively a completely manual throttle control start can be achieved by selecting a manual sequence start whereby the start proceeds as above, but the gas producer will remain at its idling speed unless lever 30 is operated to control the throttle to the desired position.

In order to prevent the fuel supply from being increased too rapidly, movement of the lever 2 is a clock wise direction is resisted by an hydraulic damper 50 having a piston rod 52 engaging the lever. Movement of the rod 52 into the damper is resisted by virtue of a variable restrictor 54 through which hydraulic fluid must be forced by the piston in the damper in passing from a pipe 56 to a pipe 58. Initially a solenoid valve 60 is closed. After a predetermined amount of movement of the lever, however, a cam 62 on the lever operates a micro-switch 64 which energizes the solenoid and opens the valve controlled by the solenoid so as to allow hydraulic fluid to pass from the pipe 56 to the pipe 58 via a fixed restrictor 66, as well as passing through the variable restrictor 54; accordingly the damper allows a faster rate of movement. During anti-clockwise movement of the lever, the piston rod 52 follows the lever by virtue of being urged outwards by hydraulic fluid passing back into the damper via the pipe 58, a non-return valve 68, and the pipe 56, owing to pressure being maintained in the pipe by virtue of a relief valve 73. The cam 62 on the lever can also operate limit switches 70 and 72 which limit movement of the lever in both directions.

An extension 74 of the shaft 4 is connected to a rotary diberential transformer feedback device which is electrically connected to the governor to feed a signal into the governor regarding the position of the lever. This device is used to provide a built-in drooping speed characteristic to the governor.

Further details of the complete system are shown in the drawing and are identified by legends on the drawing.

I claim:
1. A control system including; a shaft mounted to rotate about its longitudinal axis; a lever secured to the shaft and extending substantially radially therefrom; a manually controlled reversible motor for rotating the shaft; clutch means for disconnecting the motor from the shaft; an hydraulic servo-device connected to the lever; a governor for controlling the servo-device connected to the lever; a governor for controlling the servo-device; and a throw-over switch which in one position allows the position of the lever and thus an associated output member to be controlled automatically by the servo-device with the clutch means disengaged, and in another position causes the clutch means to engage and at the same time neutralises the servo-device whereby to enable the position of the lever to be manually controlled by the motor.

2. A control system according to claim 1, wherein a reduction gear is provided between the motor and said shaft.

3. A control system according to claim 2, wherein said reduction gear includes a worm and worm-wheel, the effective pitch of the worm being such that a torque applied to said shaft may not cause rotation of the motor.

4. A control system according to claim 1, wherein said clutch means comprises an electro-magnetic clutch.

5. A control system according to claim 1, wherein an hydraulic damper is provided for limiting the rate of change of the system output during automatic control of the lever position.

6. A control system according to claim 1, wherein limit switches are provided for co-operating with a cam portion defined by the lever, whereby to limit movement thereof.

7. A control system according to claim 1, wherein said motor is an electric motor.

8. A gas turbine having a speed control system according to claim 1.

References Cited
UNITED STATES PATENTS

| | | | |
|---|---|---|---|
| 744,486 | 11/1903 | Chadwick | 123—99 |
| 1,616,841 | 2/1927 | Beebe | 60—52X |
| 2,688,227 | 9/1954 | Geyer | 60—6 |
| 2,810,256 | 10/1957 | Geyer et al. | 60—6 |

MARTIN P. SCHWADRON, Primary Examiner

R. R. BUNEVICH, Assistant Examiner

U.S. Cl. X.R.

123—99